(12) United States Patent
Sakura et al.

(10) Patent No.: US 9,345,201 B2
(45) Date of Patent: May 24, 2016

(54) PLANT CULTIVATING APPARATUS

(75) Inventors: Syunji Sakura, Osaka (JP); Tatsuya Hirai, Osaka (JP); Kouji Kouno, Osaka (JP); Hitoshi Ohara, Osaka (JP); Go Itou, Osaka (JP)

(73) Assignee: TSUBAKIMOTO CHAIN CO., Osaka (JP)

( * ) Notice: Subject to any disclaimer, the term of this patent is extended or adjusted under 35 U.S.C. 154(b) by 682 days.

(21) Appl. No.: 13/582,030

(22) PCT Filed: Mar. 9, 2011

(86) PCT No.: PCT/JP2011/055512
§ 371 (c)(1),
(2), (4) Date: Sep. 6, 2012

(87) PCT Pub. No.: WO2011/111744
PCT Pub. Date: Sep. 15, 2011

(65) Prior Publication Data
US 2012/0324788 A1    Dec. 27, 2012

(30) Foreign Application Priority Data
Mar. 12, 2010 (JP) ................. 2010-056403

(51) Int. Cl.
*A01G 31/02* (2006.01)
*A01G 9/08* (2006.01)
*A01G 31/04* (2006.01)

(52) U.S. Cl.
CPC ............. *A01G 9/083* (2013.01); *A01G 31/04* (2013.01)

(58) Field of Classification Search
CPC ...................................................... A01G 9/083
USPC .................................................................. 47/65
See application file for complete search history.

(56) References Cited

U.S. PATENT DOCUMENTS

| | | | | |
|---|---|---|---|---|
| 1,540,694 A | * | 6/1925 | Herrick | 294/99.2 |
| 3,490,616 A | * | 1/1970 | Castaldi | 414/273 |
| 4,203,696 A | * | 5/1980 | Lindberg | 414/331.09 |
| 5,032,053 A | * | 7/1991 | Krieg | 414/278 |
| 5,121,955 A | * | 6/1992 | Visser | 294/213 |
| 5,215,550 A | * | 6/1993 | Tesch et al. | 47/1.01 R |
| 5,320,649 A | * | 6/1994 | Holland | 47/1.01 R |
| 5,557,881 A | * | 9/1996 | Bouldin et al. | 47/1.01 R |
| 8,559,679 B2 | * | 10/2013 | Lejeune et al. | 382/110 |

FOREIGN PATENT DOCUMENTS

| | | |
|---|---|---|
| JP | 01-256325 A | 10/1989 |
| JP | 09-224481 A | 9/1997 |

(Continued)

*Primary Examiner* — Kristen C Hayes
(74) *Attorney, Agent, or Firm* — Maschoff Brennan

(57) ABSTRACT

There is provided a plant cultivating apparatus for saving space in an early stage of growth of plants, increases an amount of plants cultivated per unit space to achieve higher space efficiency, and which provides an optimum environment corresponding to the growth of the plants. The plant cultivating apparatus comprises a plurality of cultivation tray storage shelves arrayed in a plurality of tiers and a plurality of rows, each of the plurality of cultivation tray storage shelves being able to store a cultivation tray capable of cultivating a plurality of plant stocks, a cultivation tray transferring mechanism for moving the cultivation tray, and a handling mechanism capable of gripping and moving the plurality of plant stocks individually from the cultivation tray.

13 Claims, 15 Drawing Sheets

(56) References Cited

FOREIGN PATENT DOCUMENTS

| JP | 10-248401 | A |   | 9/1998 |
| JP | 2000-209970 | A |   | 8/2000 |
| JP | 2000209970 | A | * | 8/2000 |
| JP | 2003-052251 | A |   | 2/2003 |
| JP | 4617395 | B1 |   | 1/2011 |

* cited by examiner

PLANT CULTIVATING APPARATUS

TECHNICAL FIELD

The present invention relates to a plant cultivating apparatus including a cultivation tray capable of cultivating a plurality of plant stocks, a plurality of plant tray storage shelves capable of storing the cultivation tray and arrayed in a plurality of tiers and a plurality of rows, and a cultivation tray transferring mechanism for permitting the movement of the cultivation tray arbitrarily in and out of the cultivation tray storage shelves.

BACKGROUND ART

Hitherto, there is known a plant cultivating apparatus which increases an amount of plants cultivated per unit area by placing a plant cultivation tray capable of cultivating a plurality of plant stocks on a plurality of cultivation tray storage shelves capable of storing the cultivation tray and arrayed in a plurality of tiers and a plurality of rows, and by carrying out works such as exposing the plant stocks to the sun, applying fertilizer, and watering the plant stocks on each of the cultivation tray storage shelves.

Also, there is known a plant cultivating apparatus which includes a cultivation tray transferring mechanism for transferring the cultivation tray into or out of any of the cultivation tray storage shelves and is capable of moving the cultivation tray to a particular work station to carry out works such as fertilization and watering needed for cultivation (see Patent Literature 1, for example).

CITATION LIST

Patent Literature

Patent Literature 1
Japanese Patent Application Laid-Open No. 2000-209970 (all pages, all drawings)

Technical Problem

However, although the known plant cultivating apparatus is capable of moving the cultivation tray to another position of the cultivation tray storage shelves in accordance with growth of plant stocks or changing cultivation conditions of each cultivation tray, it is unable to change cultivation conditions for each of the plant stocks on each cultivation tray.

Therefore, in cultivating plants which grow extensively in a horizontal direction, a wide interval needs to be provided between the respective plants from the very beginning, because it is unable to adjust the interval between the respective plants corresponding to the growth of the plants. This results in a problem of low space efficiency.

Also, in cultivating plants whose roots grow greatly in their size, a cultivation tray having a depth or shape optimized for the grown-up plants needs to be used from the very beginning, because the depth or shape of the cultivation tray cannot be changed corresponding to the growth of the plants. This leads to a problem that space efficiency is lowered by using a deep cultivation tray from the beginning and that it is unable to provide an optimally shaped cultivation tray in an early stage of the growth.

The present invention addresses the aforementioned prior art problems, and provides a plant cultivating apparatus capable of saving space in an early stage of growth of plants and increasing an amount of plants cultivated per unit space to achieve higher space efficiency while providing an optimum environment corresponding to the growth.

SUMMARY OF THE INVENTION

In order to address the aforementioned problems, according to a first aspect of the present invention, there is provided a plant cultivating apparatus including: a cultivation tray capable of cultivating a plurality of plant stocks;
  a plurality of cultivation tray storage shelves arrayed in a plurality of tiers and a plurality of rows, each of the plurality of cultivation tray storage shelves being capable of storing the cultivation tray;
  a cultivation tray transferring mechanism for moving the cultivation tray in or out of any of the plurality of cultivation tray storage shelves; and
  a handling mechanism capable of gripping and moving the plurality of plant stocks individually from the cultivation tray.

According to a second aspect of the present invention, the handling mechanism is arranged so as to be capable of gripping and moving plant stocks in the cultivation tray placed in the cultivation tray transferring mechanism.

According to a third aspect of the present invention, a particular cultivation tray storage shelve of the plurality of cultivation tray storage shelves is configured as a work station for carrying out works necessary for the cultivation.

According to a fourth aspect of the present invention, the work station also plays a role of an input/output portion for carrying the cultivation tray into/out of the station from/to the outside.

According to a fifth aspect of the present invention, the work station includes a growth detecting mechanism for detecting states of the plant stocks cultivated in the cultivation tray.

According to a sixth aspect of the present invention, the handling mechanism is provided in the cultivation tray transferring mechanism.

According to a seventh aspect of the present invention, the cultivation tray transferring mechanism is configured to be able to mount a plurality of the cultivation trays simultaneously.

According to an eighth aspect of the present invention, the cultivation tray transferring mechanism includes a growth detecting mechanism for detecting the condition of the plant stocks cultivated in the cultivation tray.

According to a ninth aspect of the present invention, the handling mechanism is provided in the work station.

According to a tenth aspect of the present invention, the growth detecting mechanism includes an imaging device and an image processing device for processing and interpreting image data obtained by the imaging device.

Advantageous Effects of Invention

Because the plant cultivating apparatus of the present invention includes the cultivation tray capable of cultivating the plurality of plant stocks, the plurality of cultivation tray storage shelves arrayed in the plurality of tiers and the plurality of rows, each of the plurality of cultivation tray storage shelves being capable of storing the cultivation tray, and the cultivation tray transferring mechanism for moving the cultivation tray in or out of any of the plurality of cultivation tray storage shelves, it is possible to increase an amount of plants cultivated per unit space as well as to achieve the effects described below.

That is, because the plant cultivating apparatus of the first aspect of the present invention includes the handling mechanism capable of gripping and moving the plant stock individually from the cultivation tray, and thus is capable of thinning out plant stocks cultivated on each cultivation tray or of moving the plant stocks individually to another cultivation tray corresponding to the growth of the plant stocks by using the handling mechanism, it is possible to save space in an early stage of the growth, to further increase the amount of plants cultivated per unit space, and to improve space efficiency while providing an optimum environment corresponding to the growth.

According to the plant cultivating apparatus of the second aspect of the present invention, because the handling mechanism is arranged so as to be capable of gripping and moving the plant stocks in the cultivation tray placed in the cultivation tray transferring mechanism, it is possible to simultaneously carry out the work of thinning out the plant stocks cultivated on each cultivation tray or of moving the plant stocks individually to another cultivation tray with the work for moving the cultivation tray. Accordingly, it is possible to improve work efficiency while simplifying management of the respective cultivation trays.

According to the plant cultivating apparatus of the third aspect of the present invention, because the particular plant cultivation tray storage shelf of the plurality of cultivation tray storage shelves is configured as the work station for carrying out works necessary for the cultivation, it is possible to aggregate works such as fertilization and watering to the work station. Accordingly, because no facilities for fertilization and watering need to be provided in the respective cultivation tray storage shelves, the facility is simplified.

According to the plant cultivating apparatus of the fourth aspect of the present invention, because the work station also plays the role of the input/output portion for carrying the cultivation tray into/out of the station from/to the outside, it is possible to improve the space efficiency further.

According to the plant cultivating apparatus of the fifth aspect of the present invention, because the work station includes the growth detecting mechanism for detecting the conditions of the plant stocks cultivated in the cultivation tray, it is possible to automatically carry out the work of thinning out the plant stocks cultivated on each cultivation tray or moving each of the plant stocks individually to another tray as well as the works needed for cultivation such as fertilization or watering in accordance with values detected by the growth detecting mechanism to further simplify the management of each cultivation tray.

According to the plant cultivating apparatus of the sixth aspect of the present invention, because the handling mechanism is provided in the cultivation tray transferring mechanism, it is possible to carry out the work of thinning out the plant stocks cultivated in each cultivation tray or of moving the plant stocks individually to another cultivation tray by using the handling mechanism at a side of the respective cultivation tray storage shelves. Accordingly, it is possible to improve the work efficiency in carrying out only the works of thinning out and moving the plant stocks.

According to the plant cultivating apparatus of the seventh aspect of the present invention, because the cultivation tray transferring mechanism is configured to be able to mount the plurality of the cultivation trays, a work of transferring the plant stocks between the cultivation trays can be completed on the cultivation tray transferring mechanism, thus improving the work efficiency further.

According to the plant cultivating apparatus of the eighth aspect of the present invention, because the cultivation tray transferring mechanism includes the growth detecting mechanism for detecting the condition of plant stocks cultivated in the cultivation tray, it is possible to detect the condition of the plant stocks without moving the respective cultivation trays to the work station. Accordingly, it is possible to improve the work efficiency further by eliminating unnecessary movements of the cultivation trays.

According to the plant cultivating apparatus of the ninth aspect of the present invention, because the handling mechanism is provided in the work station, all of the works, such as thinning out of the plant stocks cultivated in each cultivation tray, moving each of the plant stocks individually to another cultivation tray, fertilization, watering, and others necessary for the cultivation, can be integrally carried out in the work station. Accordingly, it is possible to facilitate the management of the respective cultivation trays.

According to the plant cultivating apparatus of the tenth aspect of the present invention, because the growth detecting mechanism includes the imaging system and the image processing system for processing and interpreting image data obtained by the imaging system, it is possible to comprehensively detect ripeness, illness, and the like of the plant stocks cultivated in each cultivation tray by using color information, in addition to size information of the plant stocks. Accordingly, it is possible to properly identify plant stocks to be removed to thin out the plant stocks, thus enabling to facilitate the management of each cultivation tray.

BEST MODE FOR CARRYING OUT THE INVENTION

Figure 1:
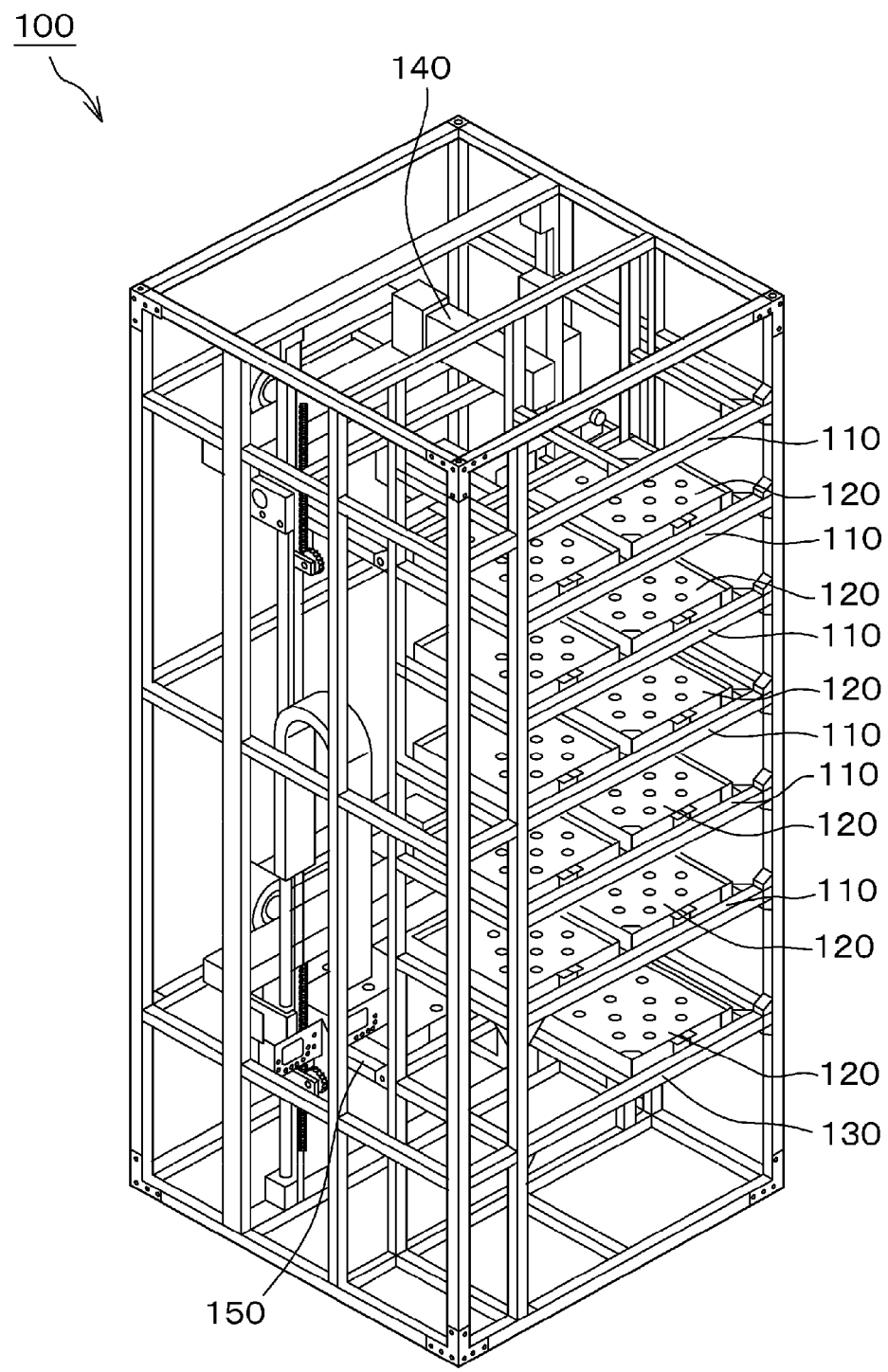
FIG. 1 is an overall perspective view of a plant cultivating apparatus of one embodiment of the present invention.

A specific mode of a plant cultivating apparatus of the present invention may be any mode as long as the plant cultivating apparatus includes a cultivation tray capable of cultivating a plurality of plant stocks, a plurality of cultivation tray storage shelves arrayed in a plurality of tiers and a plurality of rows, each of the plurality of cultivation tray storage shelves being capable of storing the cultivation tray, a cultivation tray transferring mechanism for moving the cultivation tray in or out of any of the plurality of cultivation tray storage shelves, and a handling mechanism capable of gripping and moving each of the plurality of plant stocks individually from the cultivation tray, so as to be able to save space in an early stage of growth of the plant stocks and increasing an amount of plants cultivated per unit space to increase space efficiency while providing an optimum environment corresponding to the growth.

In other words, the plant cultivating apparatus of the present invention may be used for cultivating any kinds of plants, such as vegetables, grains, beans, fruits or ornamental plants. The plant cultivating apparatus of the present invention may also start to cultivate plants from seeds, seedlings, or any other form of the plants, and stop the cultivation when the plants are in any of these forms.

Still further, the plant cultivating apparatus of the present invention may be installed either indoor, such as a plastic greenhouse or a building, or outdoor, and works such as exposing the plants to the sun, watering the plants, or applying fertilizer may be carried out in any method.

The cultivation tray used in the plant cultivating apparatus of the present invention may directly retain soil or hold a pot of soil or growing area. The cultivation tray may also be one used as a growing area in hydroponic culture or fog culture.

The works needed for cultivation at the work station of the plant cultivating apparatus of the present invention, such as fertilization or watering, may be automatically carried out as need arises as a result of sensing pH, EC, and dissolved oxygen concentration in a nursing solution used for cultivation.

First Embodiment

The plant cultivating apparatus of an embodiment of the present invention will now be explained on the basis of the accompanying drawings.

As shown in FIGS. 1 to 4, the plant cultivating apparatus 100 of one embodiment of the present invention includes cultivation tray storage shelves 110 arrayed in a plurality of tiers and a plurality of rows, each of the cultivation tray storage shelves 110 being capable of housing a cultivation tray 120 capable of cultivating a plurality of plant stocks, and a cultivation tray transferring mechanism 150 for moving the cultivation tray 120 in or out of any of the cultivation tray storage shelves 110. The cultivation tray storage shelve at a bottom tier is configured as a work station 130 for carrying out works necessary for cultivation. The cultivation tray transferring mechanism 150 is provided with a handling mechanism 140 capable of gripping and moving each of the plant stocks individually from the cultivation tray 120.

The cultivation tray storage shelves 110 at the respective tiers and the work station 130 are arrayed in two rows in a lateral direction. Corresponding to the two rows of cultivation tray storage shelves 110 at the respective tiers and the workstations 130, the cultivation tray transferring mechanism 150 is configured so as to be able to mount the two cultivation trays 120 side-by-side.

Figure 2:
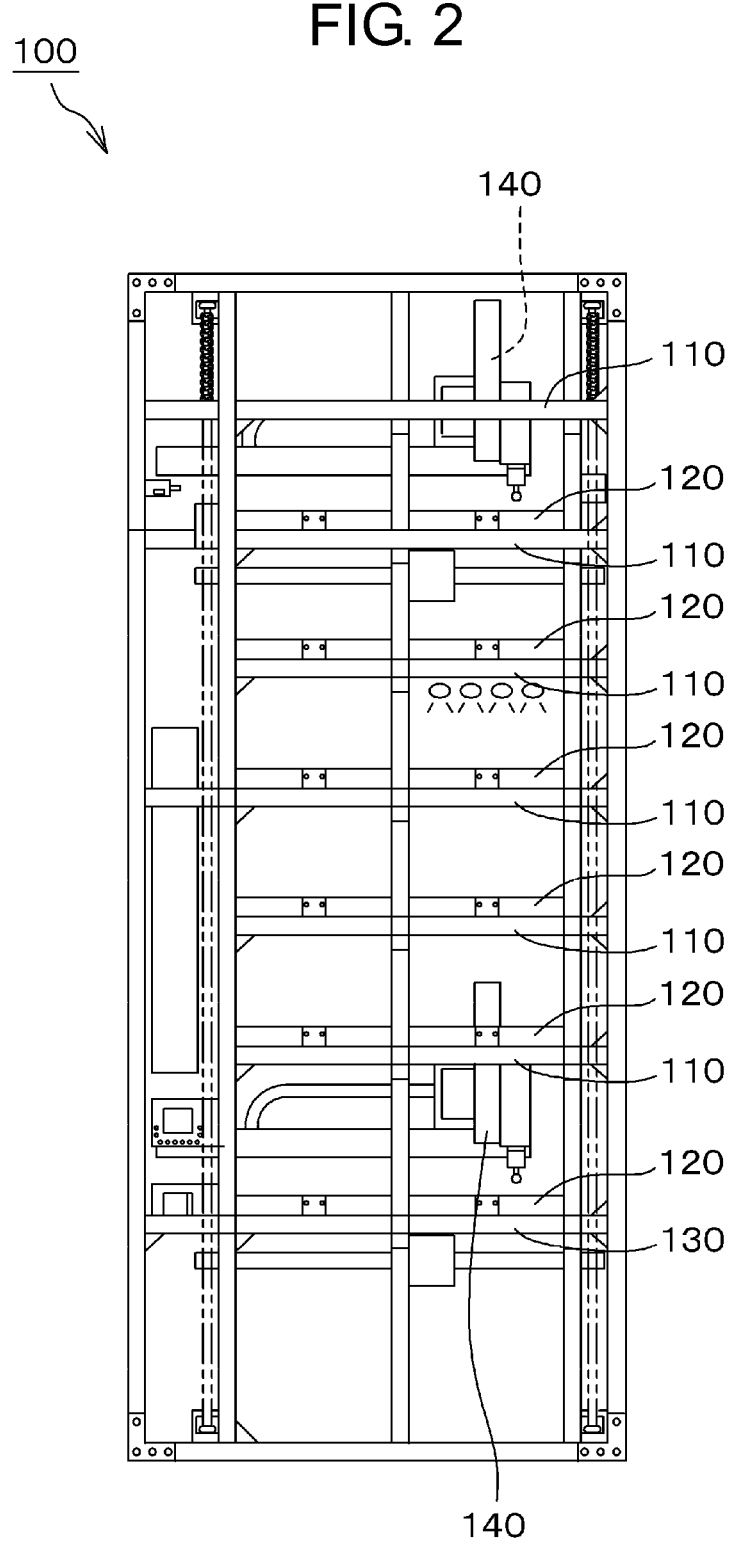
FIG. 2 is a front view of the plant cultivating apparatus shown in FIG. 1.
Figure 3:
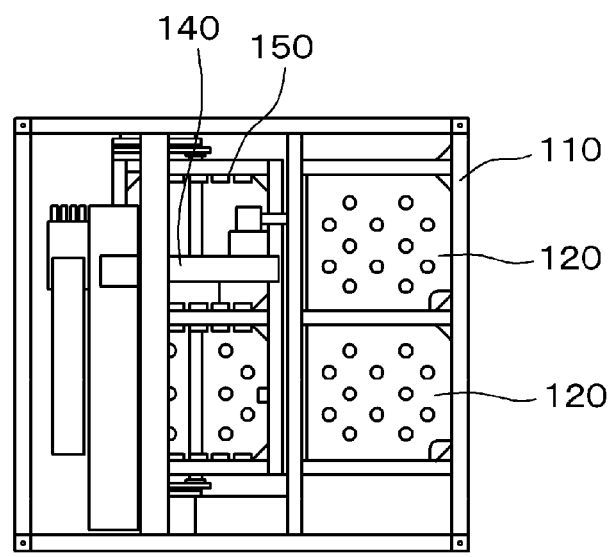
FIG. 3 is a plan view of the plant cultivating apparatus shown in FIG. 1.
Figure 4:
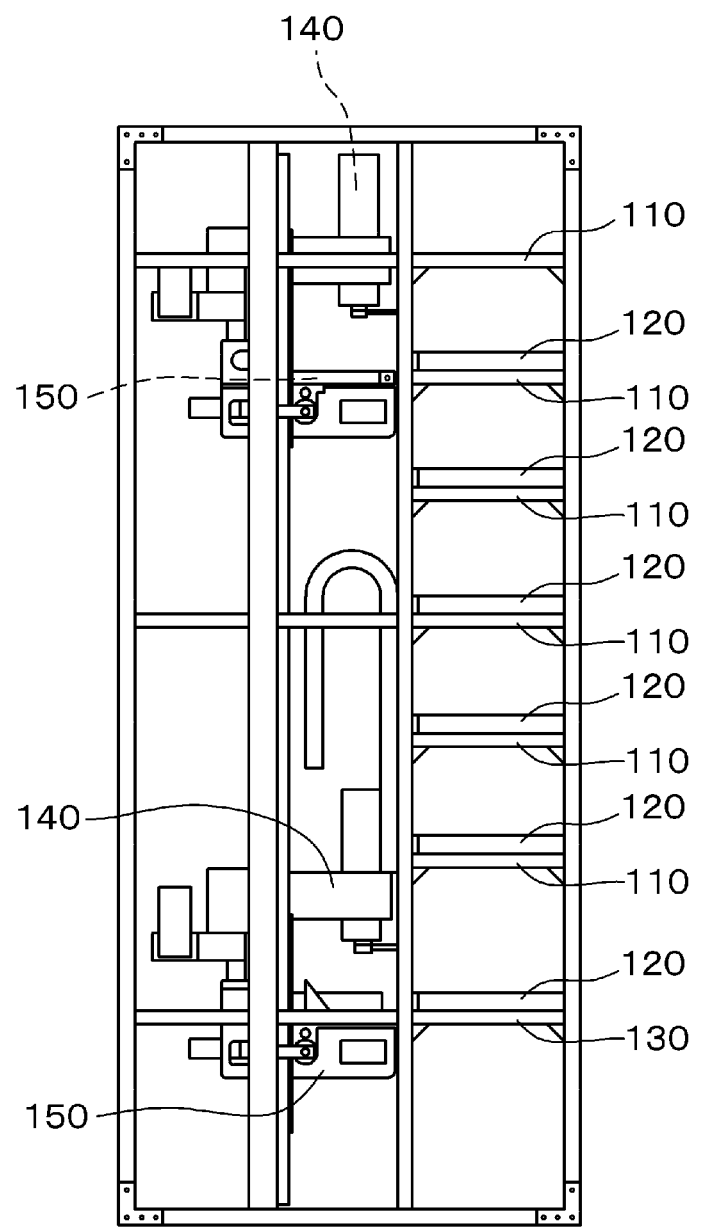
FIG. 4 is a side view of the plant cultivating apparatus shown in FIG. 1.

It is noted that FIGS. 1, 2 and 4 depict the cultivation tray transferring mechanism 150 and the handling mechanism 140 at both upper and lower parts of the plant cultivating apparatus 100 for illustrating upper and lower moving limits of the cultivation tray transferring mechanism 150 and the handling mechanism 140.

Figure 5:
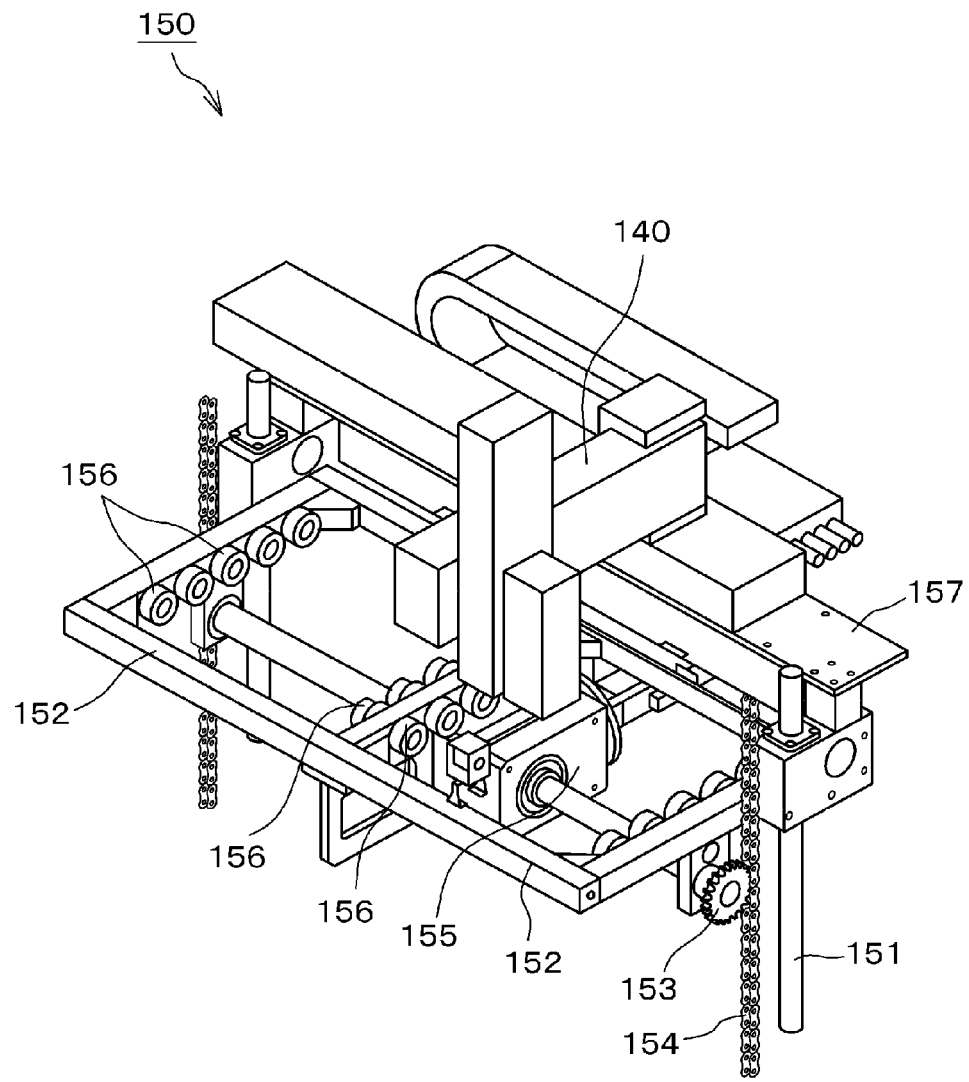
FIG. 5 is a perspective view of a cultivation tray transferring mechanism of the plant cultivating apparatus of one embodiment of the present invention.
Figure 6:
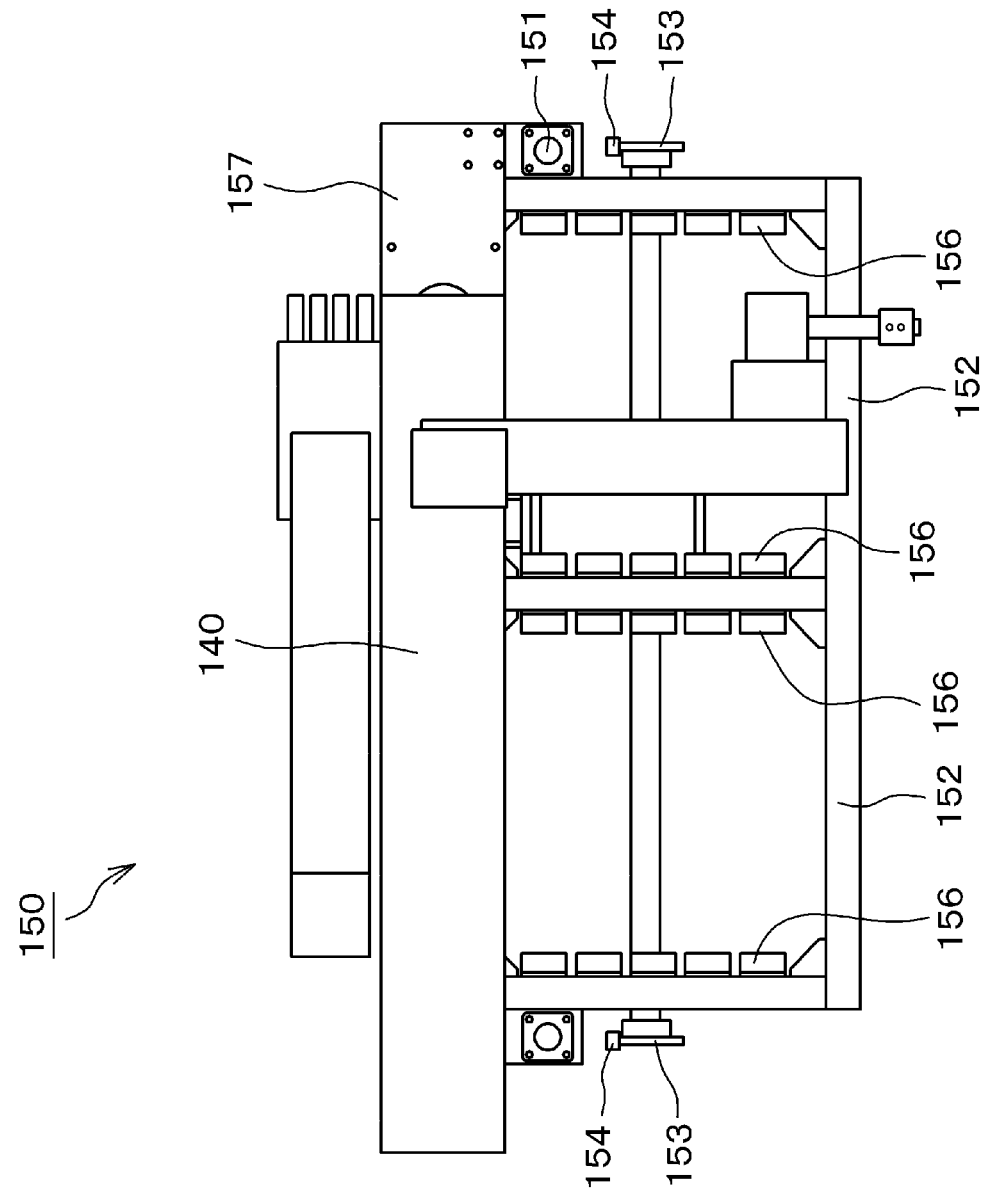
FIG. 6 is a plan view of the cultivation tray transferring mechanism shown in FIG. 5.
Figure 7:
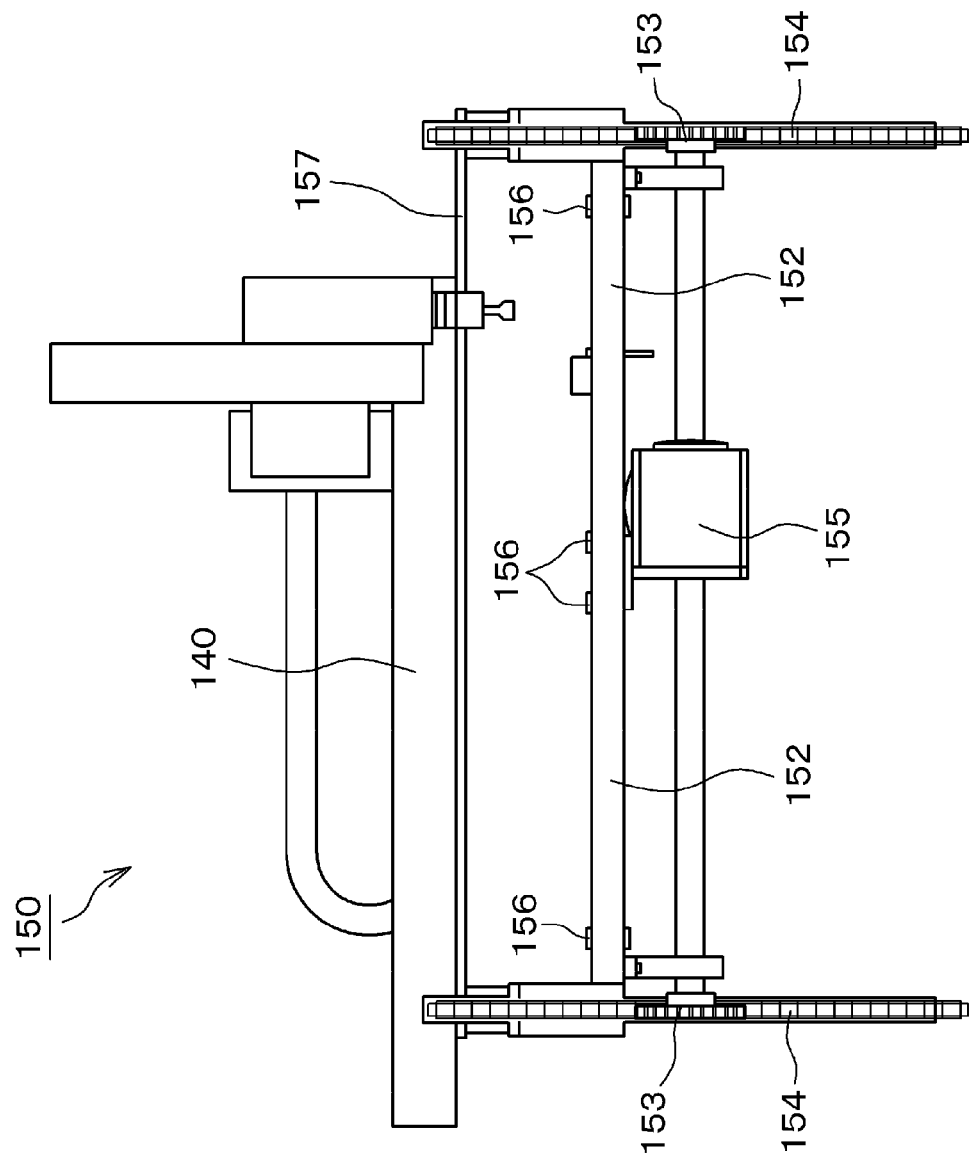
FIG. 7 is a front view of the cultivation tray transferring mechanism shown in FIG. 5.

As shown in FIGS. 5 to 7, the cultivation tray transferring mechanism 150 is configured so that a transfer shelf 152, which is capable of carrying the two cultivation trays 120 side-by-side, is movable in a vertical direction along lifting guides 151 provided at right and left parts of the mechanism 150.

In parallel with the lifting guides 151, lifting chains 154 are provided. The transfer shelf 152 moves in a vertical direction as sprockets 153 engaging with the lifting chains 154 are rotationally driven by a lift driving device 155 disposed at a bottom surface of the transfer shelf 152.

The transfer shelf 152 is provided with transfer rollers 156 along the moving direction of the two cultivation trays 120 carried thereon. The handling mechanism 140 is provided above the transfer shelf 152 via a support frame 157.

Even though the cultivation tray storage shelves 110 are arrayed in two rows and the cultivation tray transferring mechanism 150 is configured so as to lift only in the vertical direction in the present embodiment, a multiple number of the cultivation tray storage shelves 110 may be arrayed and the cultivation tray transferring mechanism 150 may be configured so as to be movable in vertical and horizontal directions by making the lifting guides 151 to be movable in the horizontal direction, thus enabling to cultivate a larger amount of plants.

Figure 8:
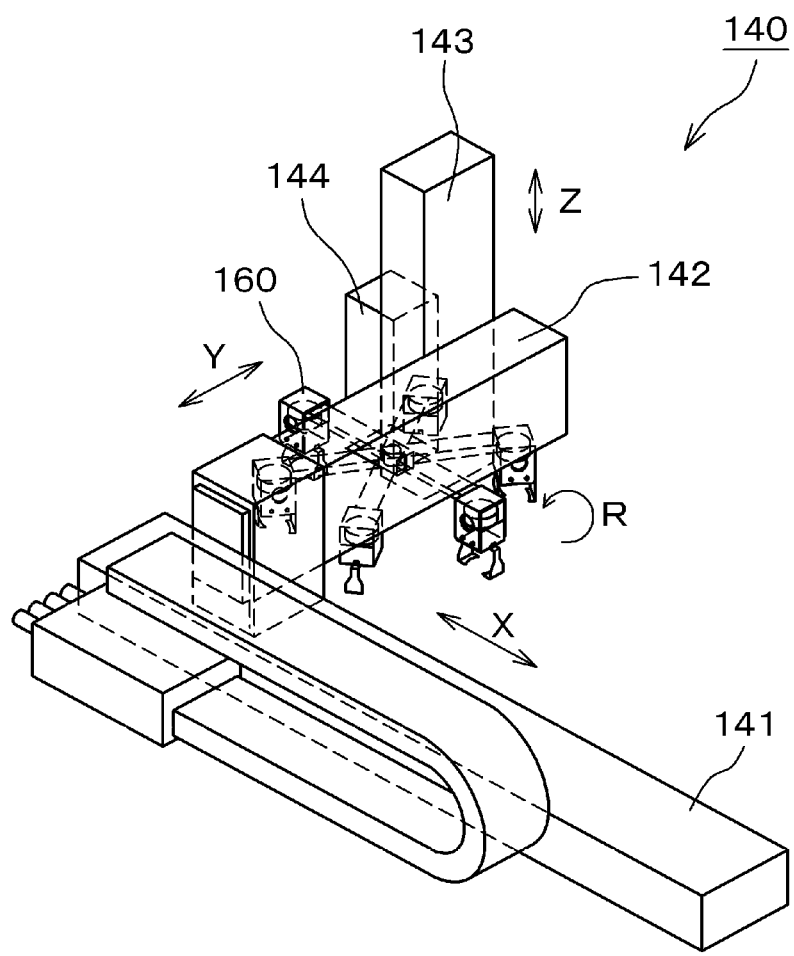
FIG. 8 is an explanatory perspective view of a handling mechanism of the plant cultivating apparatus of one embodiment of the present invention.
Figure 9:
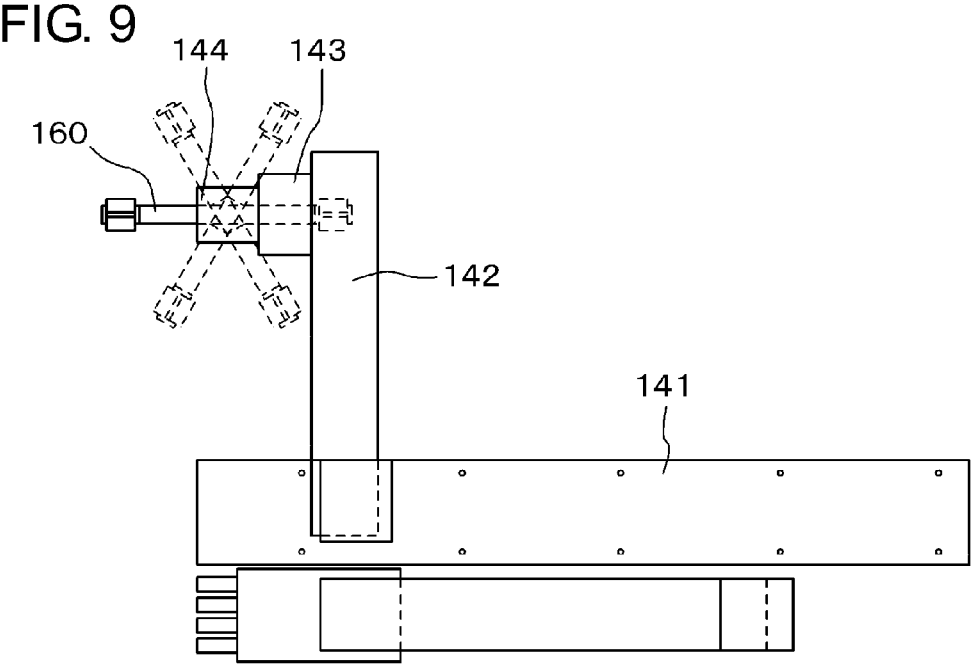
FIG. 9 is a plan view of the handling mechanism shown in FIG. 8.
Figure 10:
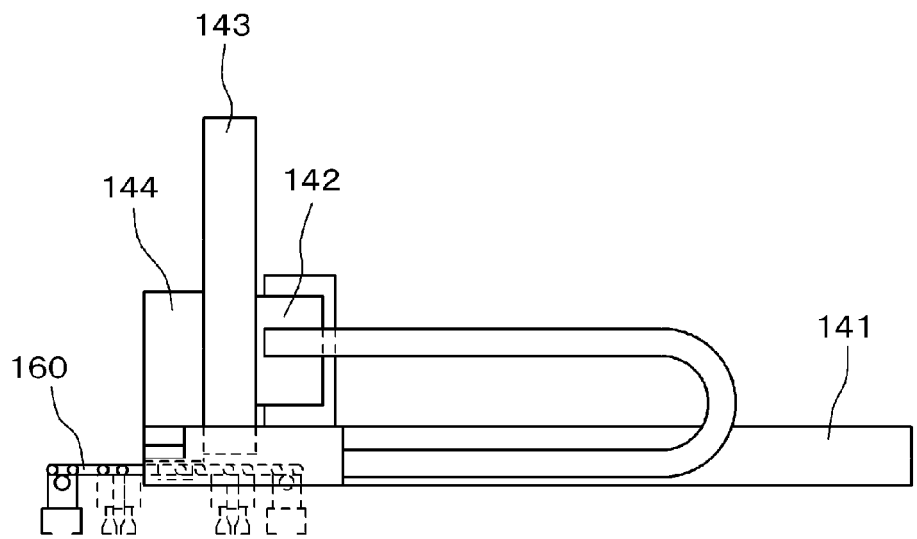
FIG. 10 is a front view of the handling mechanism shown in FIG. 8.

As shown in FIGS. 8 to 10, the handling mechanism 140 includes an X-axis frame 141, a Y-axis frame 142, a Z-axis frame 143, a gripping arm rotating device 144, and a gripping arm 160. With this configuration, a distal end of the gripping arm 160 is controlled in a total of four axes, i.e., the three axes orthogonal with each other and one rotating axis.

That is, the X-axis frame 141 is movable in a row direction of the cultivation tray storage shelves 110, i.e., in an X direction, on a support frame 157 of the cultivation tray transferring mechanism 150, the Y-axis frame 142 is movable in a direction horizontally orthogonal to the X direction, i.e., in a Y direction, on the X-axis frame 141, the Z-axis frame 143 is movable in a vertical direction to the Y-axis frame 142, i.e., in a Z direction, and the gripping arm 160 swivels due to a bottom end of the gripping arm rotating device 144 being pivotally fixed to the Z-axis frame 143.

It is noted that in FIGS. 8 to 10, the gripping arm 160 is depicted to be located in six directions to illustrate swiveling thereof.

Figure 11:
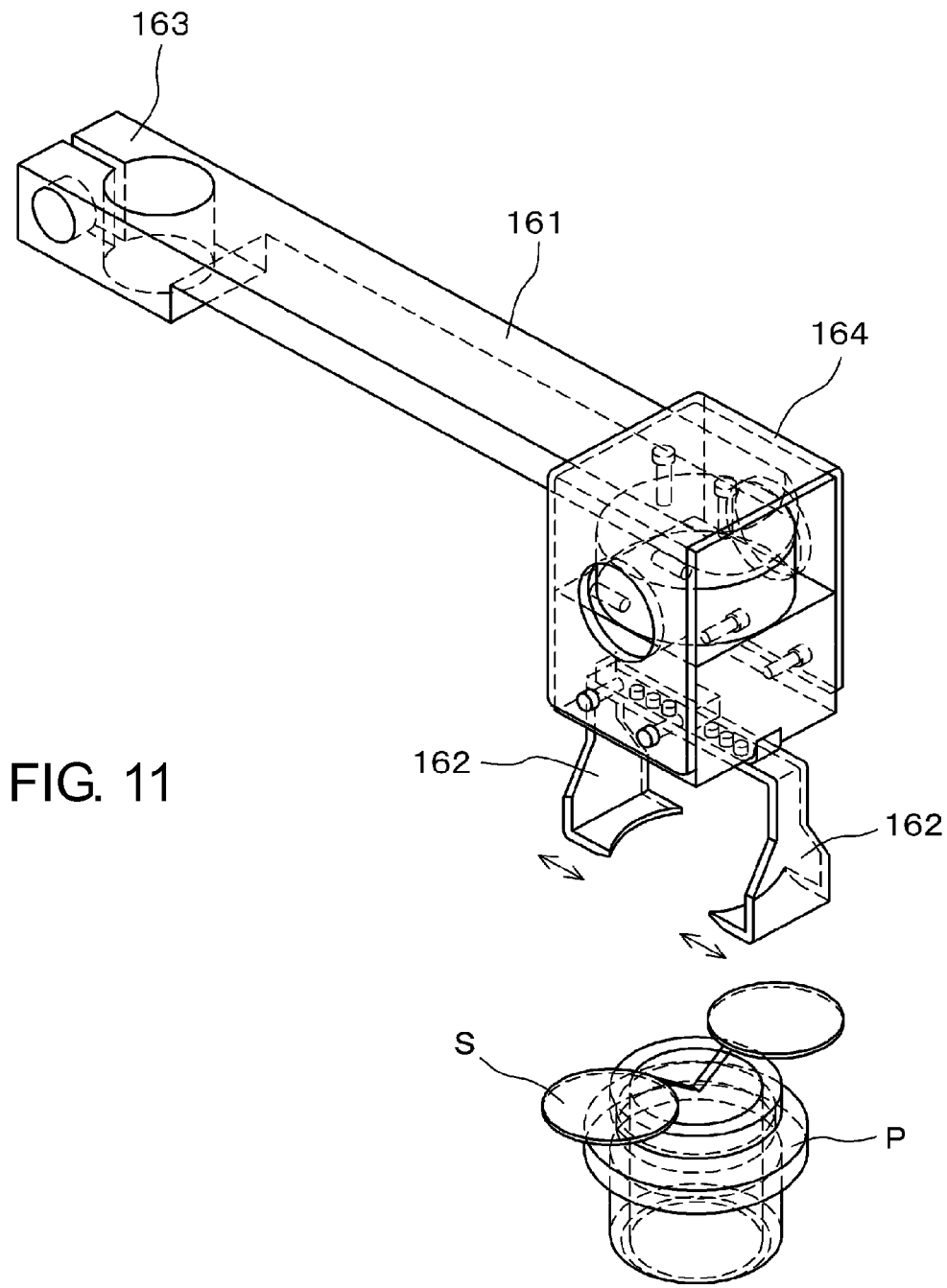
FIG. 11 is an enlarged view explaining operations of a gripping arm of the handling mechanism shown in FIG. 8.
Figure 12:
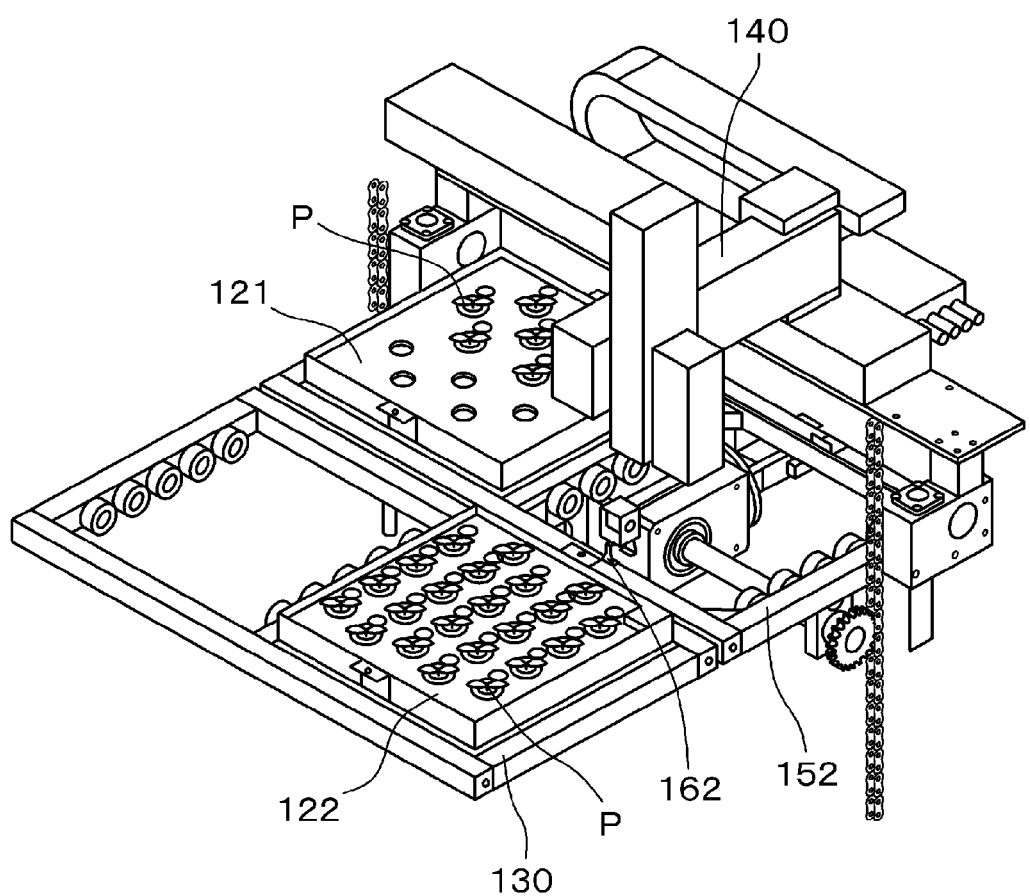
FIG. 12 is a perspective view explaining operations of the plant cultivating apparatus of one embodiment of the present invention.
Figure 13:
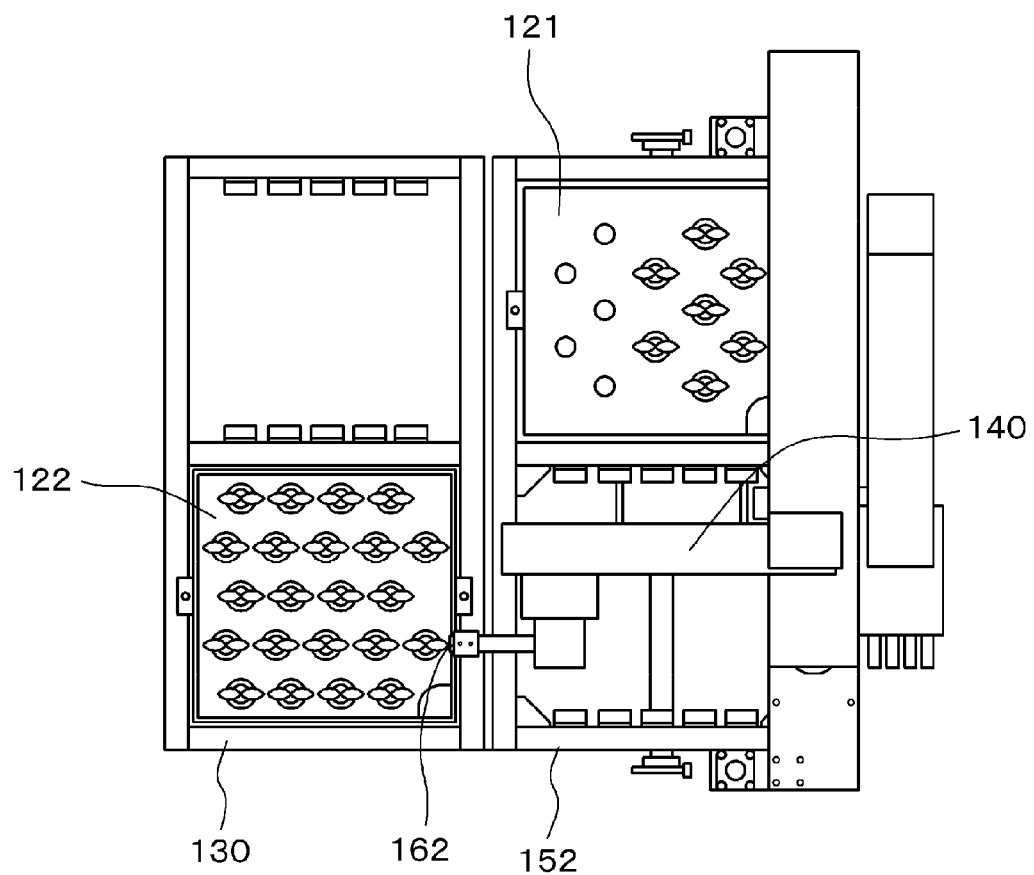
FIG. 13 is a plan view of the apparatus shown in FIG. 12.
Figure 14:
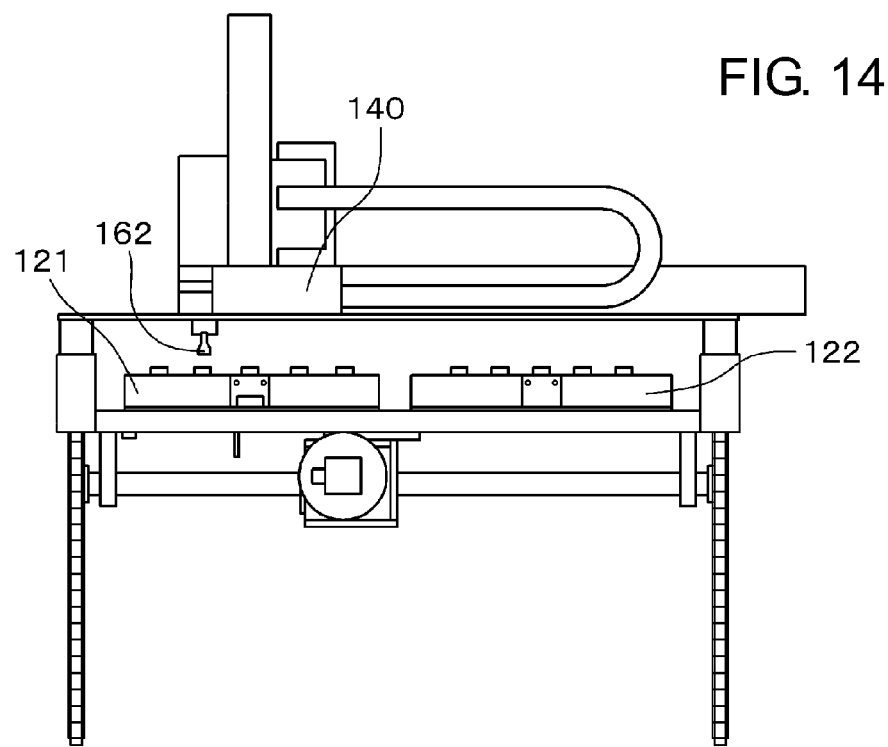
FIG. 14 is a front view of the apparatus shown in FIG. 12.
Figure 15:
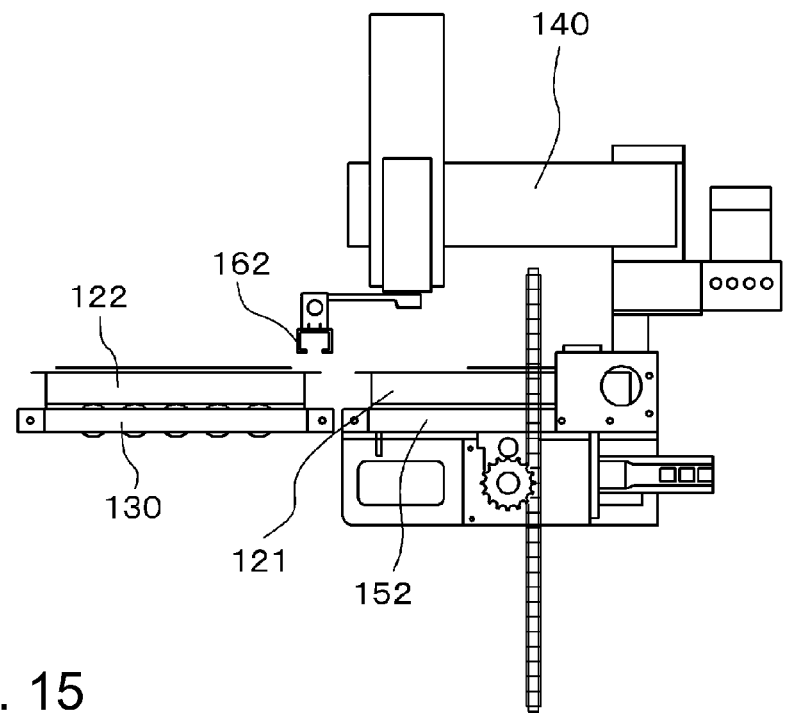
FIG. 15 is a side view of the apparatus shown in FIG. 12.

As shown in FIG. 11, the gripping arm 160 includes a swiveling portion 161 having a pivoting portion 163 at one end thereof and a gripping claw driving portion 164 at another end thereof; and a pair of gripping claws 162 provided at a lower part of the gripping claw driving portion 164. The pivoting portion 163 is fixed to a rotating shaft (not shown) of the gripping arm rotating device 144 so that the gripping arm 160 is able to swivel, and the pair of gripping claws 162 can be closed or opened by the gripping claw driving portion 164.

In the present embodiment, a plant stock S is individually planted in a nursery pot P held by the cultivation tray 120. The plant stocks S cultivated in each cultivation tray 120 are thinned out or moved to another cultivation tray 120 by gripping or releasing each nursery pot P with the gripping claws 162 of the handling mechanism 140 to place in or remove from the cultivation tray 120.

Operations of the plant cultivating apparatus 100 configured as described above will now be described on the basis of FIGS. 12 to 15.

Firstly, the nursery pot P, in which a plant stock S in its early stage of growth is planted, is placed in an early-stage cultivation tray 122 which can densely dispose a large number of the nursery pots P. Then, the early-stage cultivation tray 122 is then placed in the work station 130, which plays a role of an input/output portion for the cultivation trays as well.

The early-stage cultivation tray 122 placed in the work station 130 is moved to the cultivation tray transferring mechanism 150 and stored in any one of the cultivation tray storage shelves 110.

At this point, because the gripping claws 162 of the handling mechanism 140 are configured to handle the movement of the cultivation tray 120 between the cultivation tray transferring mechanism 150 and the work station 130 or the respective cultivation tray storage shelves 110, it is not necessary to provide a separate means for moving the cultivation tray 120.

Figure 16:
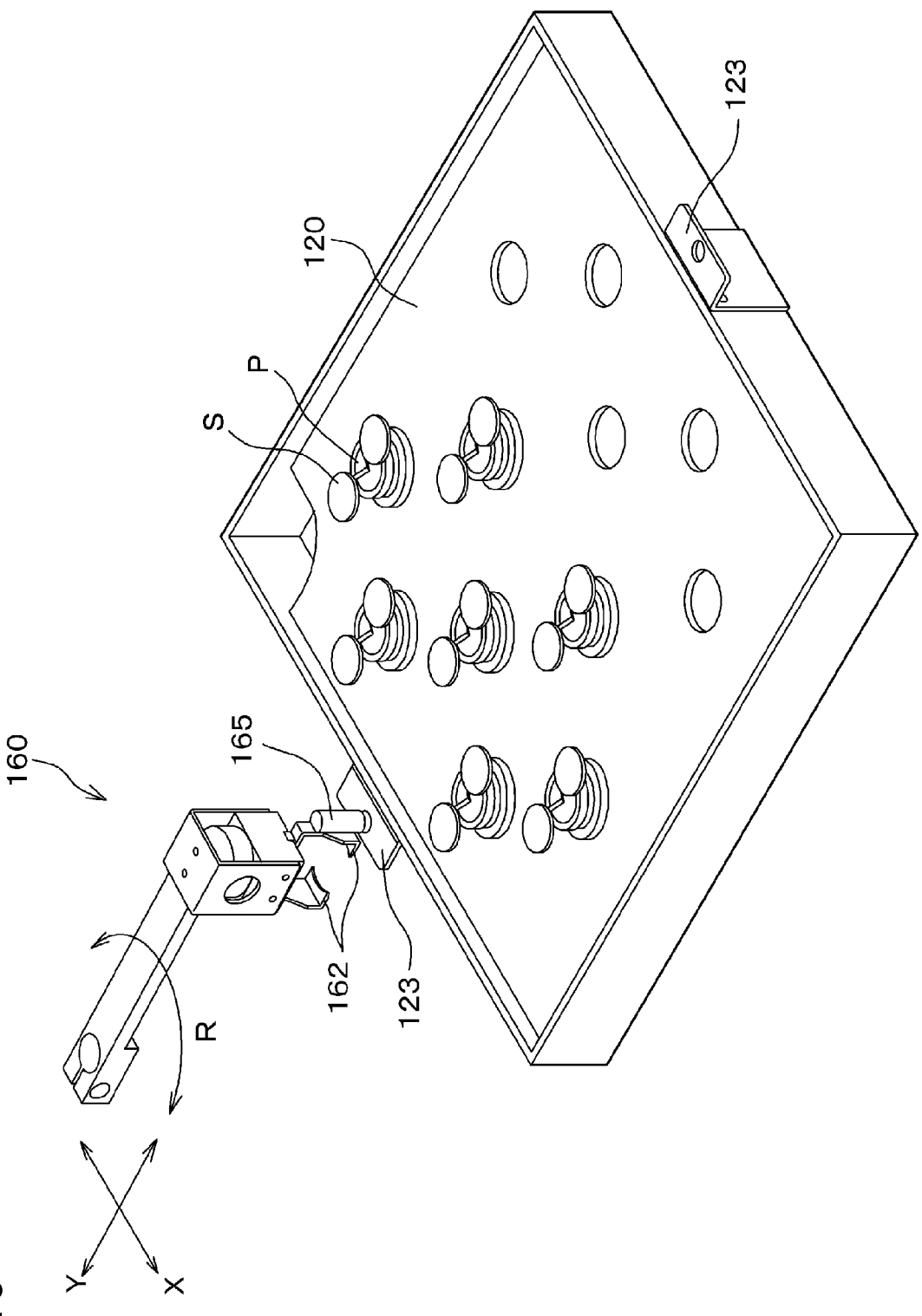
FIG. 16 is a perspective view explaining moves of the cultivation tray carried out by the handling mechanism.
Figure 17:
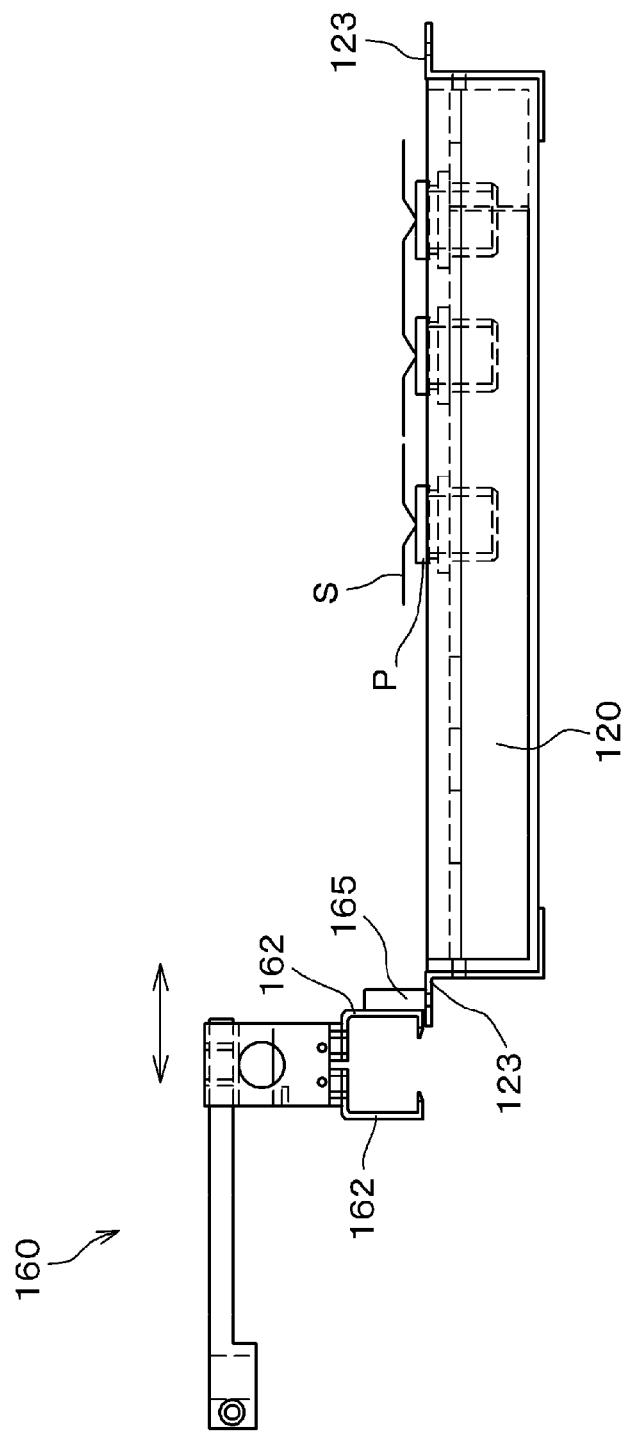
FIG. 17 is a side view of the mechanism shown in FIG. 16.

For example, as shown in FIGS. 16 and 17, the cultivation tray 120 can be moved in an anteroposterior direction by the movement of the handling mechanism 140 by providing an engaging portion 123 on an outer frame of the cultivation tray 120 and by providing a tray moving pin 165 in the gripping claws 162 of the handling mechanism 140, respectively, and by inserting the tray moving pin 165 into a hole formed through the engaging portion 123.

In each of the cultivation tray storage shelves 110, environmental conditions needed for cultivation, such as sunlight, temperature, and humidity, are adjusted. Fertilization and watering can be carried out at the work station 130 by moving the early-stage cultivation tray 122 to the work station 130 by the cultivation tray transferring mechanism 150 at the proper time. This arrangement enables to simplify the facility and facilitate its management.

The work station 130 is provided with a growth detecting mechanism (not shown) for detecting the growth of the plant stocks S. If it is determined that it is necessary to thin out the plant stocks when the early-stage cultivation tray 122 is moved to the work station 130 by the cultivation tray transferring mechanism 150, the nursery pot P is transferred by the gripping claws 162 of the handling mechanism 140 to a late-stage cultivation tray 121, as shown in FIGS. 12 to 15, in which a plurality of the nursery pots P can be sparsely arranged.

At this time, because the moving area of the gripping claws 162 of the handling mechanism 140 is limited to an area above the transfer shelf 152, both the early-stage cultivation tray 122 and the late-stage cultivation tray 121 are placed on the transfer shelf 152 side-by-side so that the nursery pot P can be transferred therebetween, unlike the illustrations of FIGS. 12 to 15.

It is noted that the early-stage cultivation tray 122 can be used for the subsequent late-stage cultivation as it is by selecting the nursery pot P to be transferred so that the remaining nursery pots P on the early-stage cultivation tray 122 are optimally spaced from each other.

The growth detecting mechanism may be composed of an imaging means such as a CCD camera so that the growth condition, diseases, and others of the plant stocks S can be detected from information on size and color to selectively transfer well-grown plant stocks S to the late-stage cultivation tray 121 while excluding undergrown or diseased plant stocks S together with the early-stage cultivation tray 122.

Still further, the handling mechanism 140 may be provided on a side of the work station 130, and the moving area of the gripping claws 162 of the handling mechanism 140 may be extended in the Y direction so that the nursery pot P can be transferred between the transfer shelf 152 of the cultivation tray transferring mechanism 150 and the work station 130 or between the respective cultivation tray storage shelves 110.

This arrangement improves a degree of freedom in terms of procedures of the works related to other cultivations and of positions in carrying out the transferring works, thus improving better overall work efficiency.

Still further, the provision of the growth detecting mechanism in the cultivation tray transferring mechanism 150 permits a determination as to whether thinning out of the plant stocks is necessary or not without moving the cultivation tray 120 to the work station 130. This arrangement enables to carry out the work of transferring the nursery pot P by the side of the respective cultivation tray storage shelves 110 and increases the work efficiency.

Even though the gripping claws 162 of the handling mechanism 140 are configured to be able to grip and release the nursery pot P in the embodiment described above, the gripping claws 162 of the handling mechanism 140 may be configured to be able to directly grip the plant stock S and to thin out the plant stocks if the plant stocks are cultivated directly in the cultivation tray 120 without using the nursery pot P.

Even though the plurality of tiers of the cultivation tray storage shelves 110 is provided only on a front side of the cultivation tray transferring mechanism 150 in the present embodiment, the plurality of tiers of the cultivation tray storage shelves 110 may also be provided on a back side of the cultivation tray transferring mechanism. Still further, the length in the Y direction of the respective cultivation tray storage shelves 110 may be extended so that a plurality of the cultivation trays 120 can be placed in tandem in the Y direction.

This arrangement enables to increase the number of the cultivation trays 120 to which cultivation works can be carried out with one cultivation tray transferring mechanism 150 and one work station 130 and improves the space efficiency further.

Still further, the height of the cultivation tray storage shelves 110 may be differentiated per each tier so that the cultivation tray 120 can be stored in different tiers of the cultivation tray storage shelves 110 corresponding to the growth of the plants cultivated in the cultivation tray 120.

Also, in order to adjust temperature and humidity, the whole plant cultivating apparatus 100 may be wrapped with a cover and air may be sent to the plant cultivating apparatus 100 from an air conditioner. A partition or the like may be also provided to adjust environmental conditions per each cultivation tray storage shelve 110.

An air conditioning unit or a power supply system may be installed in a space under the bottom tier of the cultivation tray storage shelves 110 to reduce an overall footprint of the plant cultivating apparatus 100.

As described above, according to the present invention, it is possible to save space in the early stage of growth of plants and to increase the amount of plants cultivated per unit space, thus improving the space efficiency while providing the optimum environment corresponding to the growth.

The actual configuration of the cultivation tray transferring mechanism 150 is not limited to the configuration of the embodiment illustrated herein, and any configuration may be adopted as long as the cultivation tray transferring mechanism 150 is capable of moving the cultivation tray 120 in or out of any of the cultivation tray storage shelves 110.

The actual configuration of the handling mechanism 140 is not also limited to the configuration of the embodiment illustrated herein, and any configuration may be adopted as long as the handling mechanism 140 is capable of gripping and releasing and transferring the nursery pot P or the plant stock S between the cultivation trays.

DESCRIPTION OF REFERENCE NUMERALS

- 100 Plant cultivating apparatus
- 110 Cultivation tray storage shelf
- 120 Cultivation tray
- 121 Late-stage cultivation tray
- 122 Early-stage cultivation tray
- 123 Engaging portion
- 130 Work station
- 140 Handling mechanism
- 141 X-axis frame
- 142 Y-axis frame
- 143 Z-axis frame
- 144 Gripping arm rotating device
- 150 Cultivation tray transferring mechanism
- 151 Lifting guide
- 152 Transfer shelf
- 153 Lifting sprocket
- 154 Lifting chain
- 155 Lift driving device
- 156 Transfer roller
- 157 Support frame
- 160 Gripping arm
- 161 Swiveling portion
- 162 Pivoting portion
- 163 Gripping claw
- 164 Gripping claw driving portion
- 165 Tray moving pin
- S Plant stock
- P Nursery pot

The invention claimed is:

1. A plant cultivating apparatus comprising:
    a cultivation tray capable of cultivating a plurality of plant stocks;
    a plurality of cultivation tray storage shelves arrayed in a plurality of tiers and a plurality of rows, each of the plurality of cultivation tray storage shelves being capable of storing the cultivation tray;
    a cultivation tray transferring mechanism for moving the cultivation tray in or out of any of the plurality of cultivation tray storage shelves; and
    a handling mechanism capable of gripping and moving the plurality of plant stocks individually from the cultivation tray,
    wherein a particular cultivation tray storage shelf of the plurality of cultivation tray storage shelves is configured as a work station, where the handling mechanism is disposed such that the plant stocks are gripped and moved individually from the cultivation tray within the work station for carrying out works necessary for the cultivation, the handling mechanism being disposed entirely within the work station.

2. The plant cultivating apparatus according to claim 1, wherein the handling mechanism is arranged so as to be capable of gripping and moving plant stocks in the cultivation tray placed in the cultivation tray transferring mechanism.

3. The plant cultivating apparatus according to claim 2, wherein the work station is also an input/output portion for carrying the cultivation tray into/out of the work station from/to outside the work station.

4. The plant cultivating apparatus according to claim 2, wherein the work station includes a growth detecting mechanism for detecting conditions of the plant stocks cultivated in the cultivation tray.

5. The plant cultivating apparatus according to claim 4, wherein the growth detecting mechanism includes:
    an imaging device; and
    an image processing device for processing and interpreting image data obtained by the imaging device.

6. The plant cultivating apparatus according to claim 2, wherein the handling mechanism is provided in the work station.

7. The plant cultivating apparatus according to claim 1, wherein the work station also comprises an input/output portion for carrying the cultivation tray into/out of the work station from/to outside the work station.

8. The plant cultivating apparatus according to claim 1, wherein the work station includes a growth detecting mechanism for detecting conditions of the plant stocks cultivated in the cultivation tray.

9. The plant cultivating apparatus according to claim 8, wherein the growth detecting mechanism includes:
    an imaging device; and
    an image processing device for processing and interpreting image data obtained by the imaging device.

10. The plant cultivating apparatus according to claim 1, wherein the handling mechanism is provided in the cultivation tray transferring mechanism.

11. The plant cultivating apparatus according to claim 1, wherein the cultivation tray transferring mechanism is configured to be able to mount a plurality of the cultivation trays simultaneously.

12. The plant cultivating apparatus according to claim 1, wherein the cultivation tray transferring mechanism includes a growth detecting mechanism for detecting the conditions of the plant stocks cultivated in the cultivation tray.

13. The plant cultivating apparatus according to claim 1, wherein the handling mechanism is provided in the work station.

* * * * *